United States Patent [19]
de Luca

[11] Patent Number: 5,111,035
[45] Date of Patent: May 5, 1992

[54] DIGITAL ANODE TO DETERMINE THE LOCATION OF ELECTRONS ON A GIVEN SURFACE

[75] Inventor: Adriano de Luca, Manzana, Mexico

[73] Assignee: Universidad Autonoma Metropolitana, Mexico

[21] Appl. No.: 483,915

[22] Filed: Feb. 22, 1990

[51] Int. Cl.⁵ .............................................. H01V 31/50
[52] U.S. Cl. ............................... 250/213 VT; 313/532
[58] Field of Search ......... 250/213 R, 213 VT, 206.1, 250/206.2; 313/523, 532

[56] References Cited

U.S. PATENT DOCUMENTS

| | | | |
|---|---|---|---|
| 4,555,731 | 11/1985 | Zinchuk | 250/213 VT |
| 4,604,519 | 8/1986 | Zollman et al. | 250/213 VT |
| 4,837,631 | 6/1989 | Hicks | 250/213 VT |
| 4,916,543 | 4/1990 | Crosby | 250/213 VT |

Primary Examiner—David C. Nelms
Attorney, Agent, or Firm—Silverman, Cass & Singer, Ltd.

[57] ABSTRACT

The present invention refers to a digital anode that permits capturing electrons and digitalizing their location on a given surface, so that it can be stored in a memory to be later processed and either interpreted, printed, filtered or transferred.

3 Claims, 4 Drawing Sheets

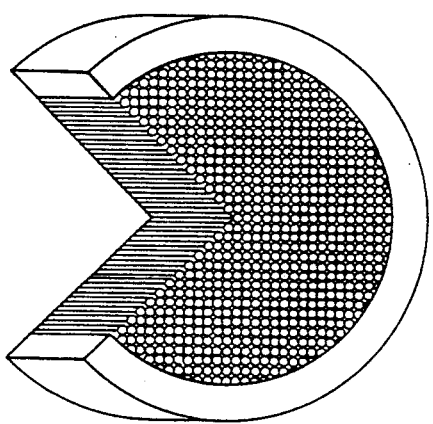
Fig. 1a
Prior Art
Fig. 1b
Prior Art
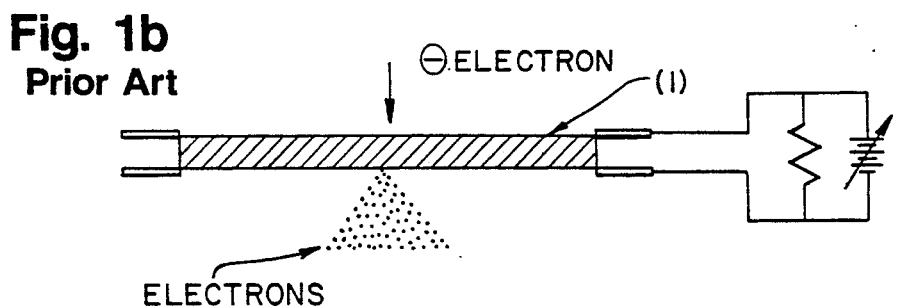
Fig. 2
Prior Art
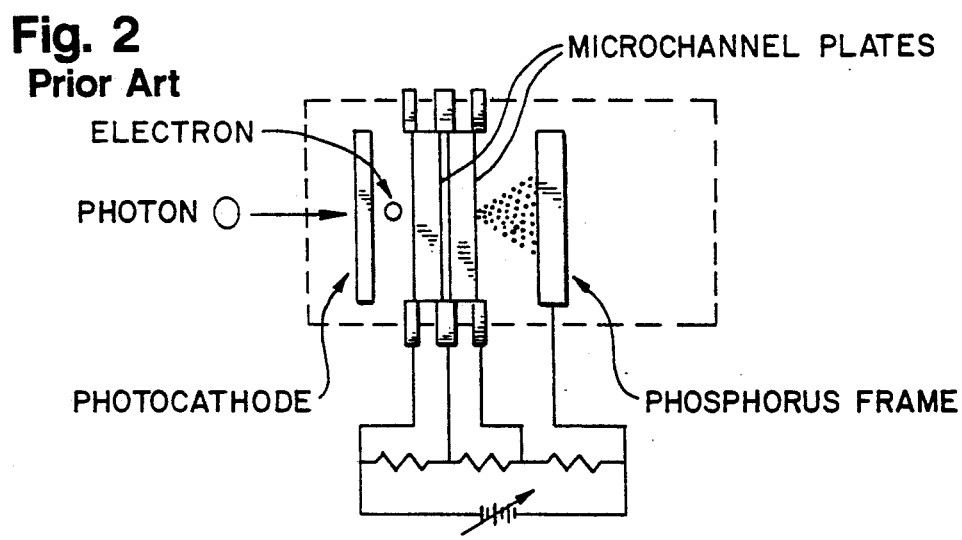

Fig. 3
Prior Art
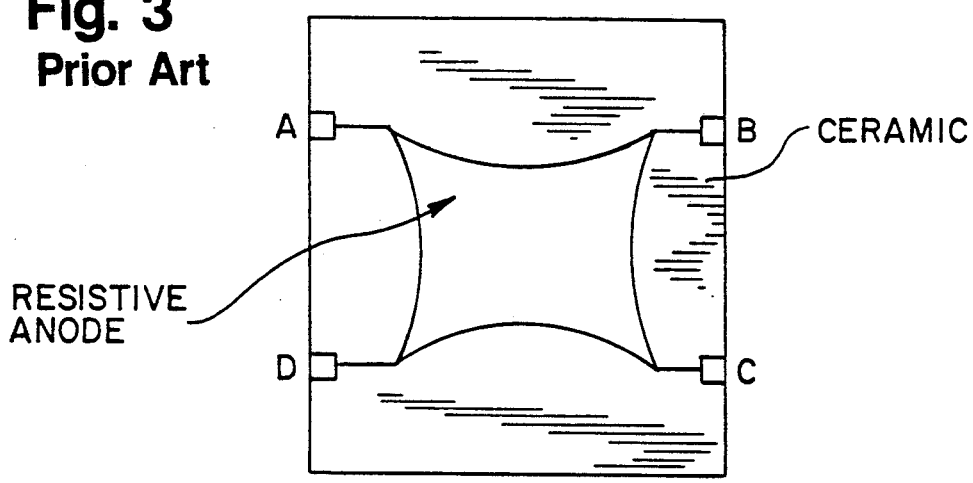
Fig. 4a
Prior Art
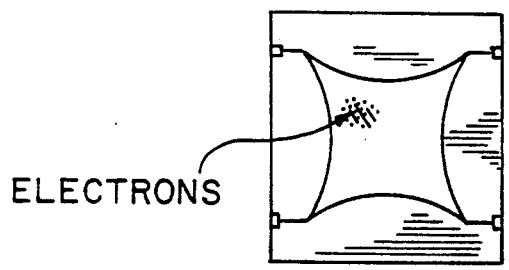
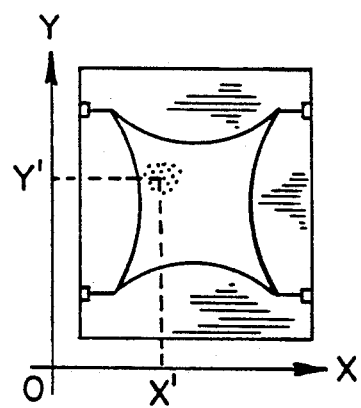
Fig. 4b
Prior Art
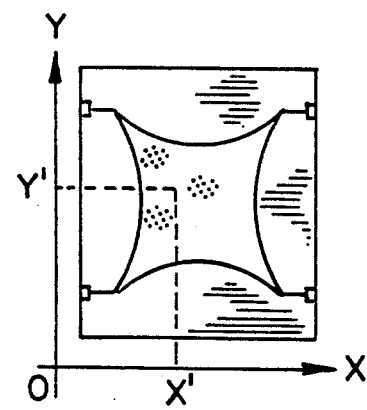
Fig. 4c
Prior Art $x = \log_2 m$
$y = \log_2 m$ $X = 10\mu$ TO 20 INCH
$Y = 10\mu$ TO 20 INCH $\left.\begin{array}{c}A_0 \ldots A_{V-1}\\B_0 \ldots B_{W-1}\end{array}\right\}$ = THE VALUE OF X AND Y DEPENDS ON THE NUMBER OF COLUMNS AND ROWS OF THE ARRAY $N = 1\mu$ TO $100\mu$
$M = 1\mu$ TO $100\mu$

DIGITAL ANODE TO DETERMINE THE LOCATION OF ELECTRONS ON A GIVEN SURFACE

FIELD OF THE INVENTION

To obtain images of objects whose luminosity is very poor, at night, or of very distant objects is a problem that is at present solved by utilizing microchannel plates (see FIG. 1) which is a device formed by grouping close together millions of capillary tubes whose inner walls are coated by an electro-sensitive material, when a voltage is applied between the two surfaces of the microchannel plate and one or more electrons arrive and collide with the wall, and avalanche mechanism is untied with the consequent multiplication of electrons. This multiplication results in the quantity of electrons emerging from the microchannel plate being much greater than that at the entrance, which allows this electron cloud to be utilized to reproduce a sharper and clearer image, that the human eye can distinguish perfectly. A very common use of this principle is a photocathode that transforms photons into electrons (see FIG. 2) which are multiplied, as previously stated, by the microchannel plates and at the outlet a phosphorus screen is placed on which the electrons strike, allowing for the visualization of the image. If the phosphorus screen is substituted by a device called a digital anode that permits the location of the resulting electron cloud in a system of coordinate axis XY, the image can then be digitalized and saved in a computer memory to be later processed mathematically. This change allows the image to be treated in a scientific form which renders greater advantages than if only a phosphorus screen is utilized. The most immediate application of the digital anode is the substitution of the resistive anode in all those systems that use it today, with all the advantages that this represents and encompasses fields as different as biomedicine and computerized tomography; astronomy, and the detection of photons emitted by distant stars, perhaps inexistent at present; electronic microscopy, in the identification of molecular structures and other applications that will depend on the system that will be developed in the near future.

BACKGROUND OF THE INVENTION

Digitalizing an image and determining the location of a certain amount of electrons on a given surface is at present time carried out using, for instance, a "resistive anode", which is a metallic film of a square shape, mounted on a ceramic surface (see FIG. 3) with 4 terminals, one on each corner, connected to current amplifiers. At the arrival of a certain amount of electrons to a given place in the surface, these create an electric current that is displaced, upon being attracted by electric fields to the 4 terminals. The amount of electrons that are gathered at each corner depends on the exact point of arrival of the electrons, that is to say, the closest terminal captures the greatest number and the farthest one, the least amount of them (see FIG. 4a). The generated current has a very low value and it is necessary to be amplified and processed by means of special circuits which are relatively expensive. Already processed signals are utilized to determine, on a coordinate XY axis system, the position of the geometric center of the electron cloud (see FIG. 4b).

One of the disadvantages of the use of the resistive anode, in cases like the one stated above, is that when 2 or more electron clouds are present at the same time, the result in that the geometric center of the clouds can be false (as it is in FIG. 4c). Other disadvantages are, for instance, its high cost; the necessary electronics that must be added for its adecuate functioning; the slow system response upon arrival of the electrons; furthermore, the exact location of the center of the electron cloud depends on the precise measurement of the small currents that travel to the corners, which are easily contaminated with noise, giving non-dependable results.

OBJECTIVES OF THE INVENTION

It is an object of the present ivention to substitute the use of the resistive anode by the digital anode, considering that its industrial production is more reliable and faster than that of the resistive anode, since the same system of production of electronic integrated systems can be used.

It is another object of he invention to reduce drastically the overall size of the system by eliminating the need to install low current amplifiers as well as the need for electric circuits to calculate the values of XY coordinates.

Another object of the invention is to reduce the energy consumption as a consequence of the elimination of the low current amplifiers and the electronic circuits previously mentioned.

Another object of the invention is to obtain a quicker response than by using a resistive anode in similar applications.

Still another object of the invention is to eliminate the problem that represents the presence of several electron clouds simultaneously, since the process of digitalization is eliminated in the case of purely digital decoding and in the case of analogic decoding, the digitalization process is also eliminated by filtering the higher voltage values that are the result of having more than one electron cloud present, and to obtain more precision in determining the exact location of electron clouds as well as to maintain said precision regardless of the position of the clouds, which precision in the case of the resistive anode tends to diminish as the position of the electron clouds gets away from the center.

Further objects and advantages of this invention shall be apparent to one skilled in this field at the light of the following description and drawings.

BRIEF DESCRIPTION OF THE DRAWINGS

FIG. 1(a) is a perspective view in partial section of a microchannel plate;

FIG. 1(b) is a schematic representation illustrating electron movement upon application of a voltage between two faces of a microchannel plate;

FIG. 2 is a schematic representation illustrating a pair of microchannel plates in use for observing very weak light energy;

FIG. 3 is a plan view illustrating a resistive anode which is a thin film of a resistive material placed over a ceramic base;

FIG. 4(a) is a plan view of a resistive anode, similar to FIG. 3, illustrating an electron cloud striking thereon;

FIG. 4(b) is a plan view of a resistive anode, similar to FIG. 4(a), illustrating the displacement and locating of the electrons thereon;

FIG. 4(c) is a plan view of a resistive anode, similar to FIGS. 4(a) and 4(b), illustrating several electron clouds striking thereon and the coordinates of the geometric center of the clouds;

FIG. 5b is an enlarged view of one active element shown in FIG. 5a;

DESCRIPTION OF THE INVENTION

As a consequence of the above mentioned, it has been investigated that the digital anode is a good alternative to the resistive anode, with considerable advantages, which are described further on.

Figure 5A:
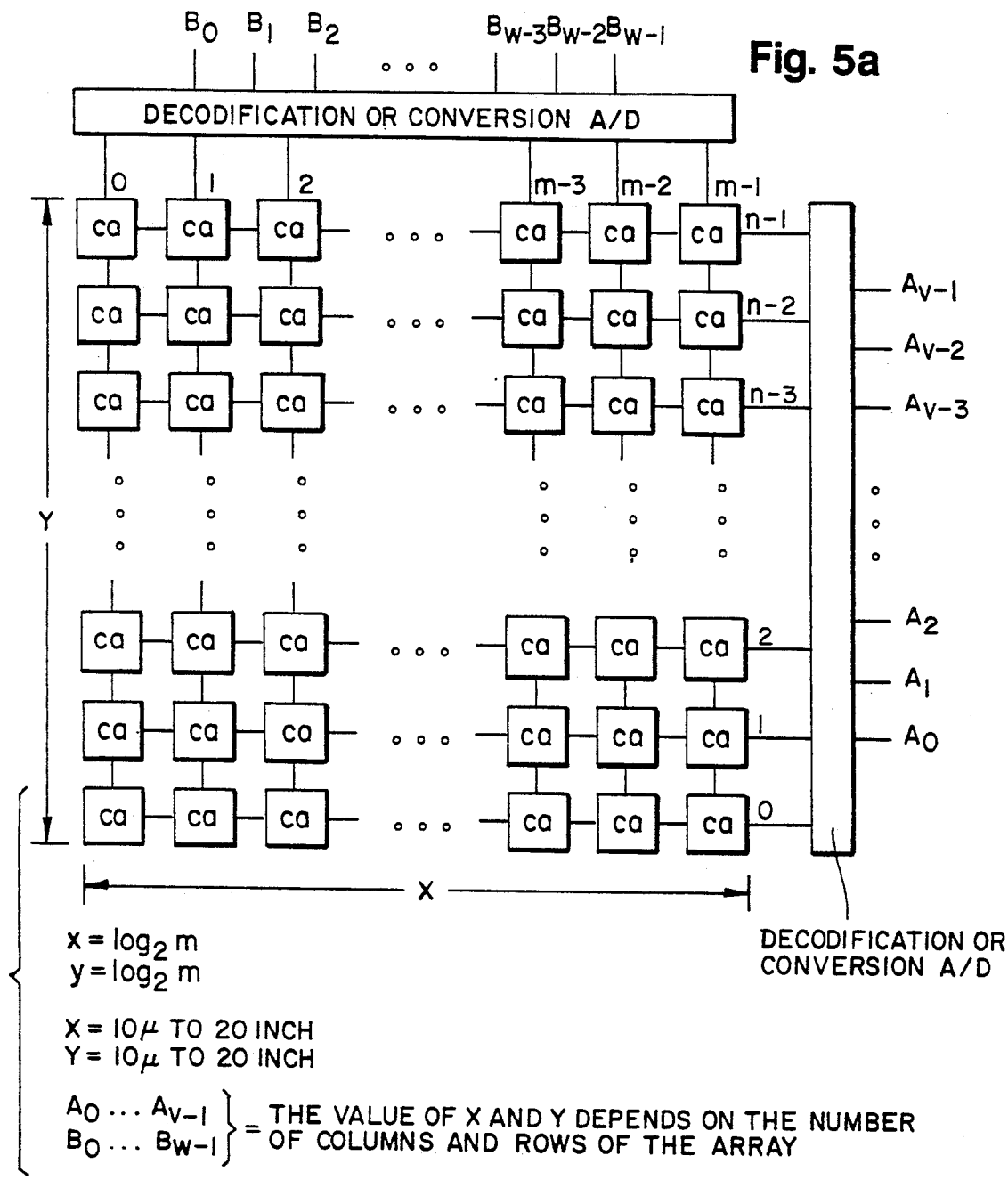
FIG. 5a schematic representation of a digital anode device made of semiconductor material illustrating the active elements laid out in the form of a mesh or net.
Figure 5B:
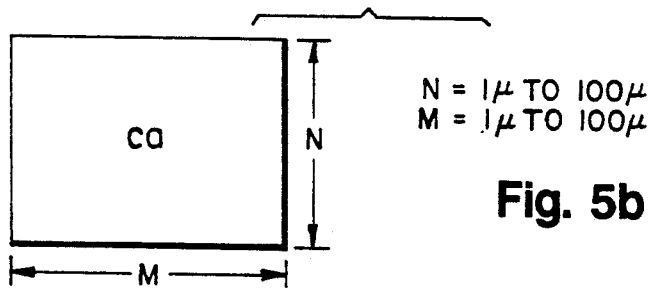

The digital anode (see FIG. 5), is an arrangement of electronic circuits that act as transducers or active cells (ac) interconnected in the form of rows and columns, the amount of which would depend on the particular application. Each one of the rows or columns is connected to the inlet of an electronic circuit called "decoder", which renders, in binary form, the location of the activated cell. For example, if the marked cell in FIG. 5 is the one that has been activated, the row-decoder will give a binary number corresponding to number 1, and the column - decoder will give a binary number corresponding to No. 2, the activated cell being thus perfectly located.

Figure 6:
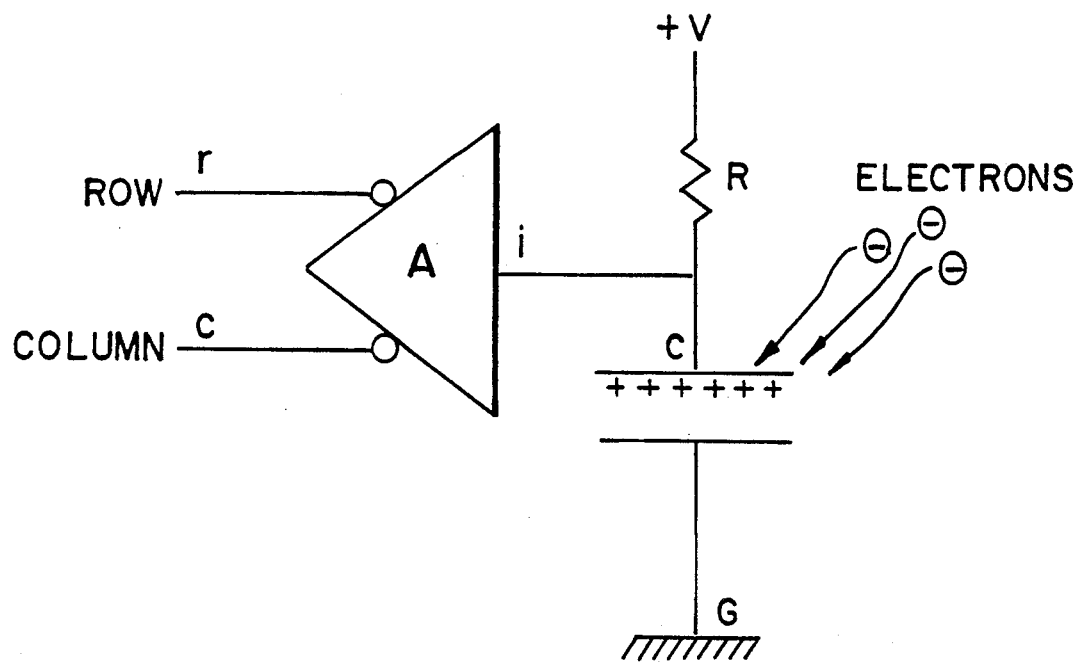
FIG. 6 is a schematic representation of a digital anode of an activated cell.

The transducer or active cell is composed by electronic elements such as transistors, capacitors, resistors, etc. connected in such a form that they are sensitive to the arrival of electrons and in the presence of a certain number of them, generate an output positive voltage of a fixed value. FIG. 6 represents an example of how an active cell could be conformed. The input (I) to the amplifier is a circuit of the RC type (resistance-condenser) connected, on one end to the voltage +V, and on the other to the ground (G). The output lines (r & c) are connected to the row and column lines respectively. In the circuit shown, the capacitor upper plate is charged with positive charges, the number of which depends directly on the voltage +V applied on the capacitance C. Before the arrival of the electrons (negative charge) the voltage in the capacitor at the input of the amplifier is +V, and the output r and c have a value equal to or close to ground (G). Upon the arrival of a certain number of electrons, an equal quantity of positive charges is neutralized, which results in a decrease of the capacitor voltage at the input of the amplifier. This decrease at the input prompts a positive pulse of constant amplitude in the output r & c of the amplifier.

The decoder is an electronic circuit, with as many inputs as rows or columns there are in the activated row or column. The number of lines (digits) to determine the row or column is given by the relations:

$Y = \log_2 n$ $X = \log_2 m$ where Y or X are the number of binary digits necessary to represent the n or m corresponding lines. These two numbers, the row number and the column number, indicate the precise location of the activated cells in a system of coordinate axis XY.

The decoding process can be carried out in the following different forms:

Purely digital decoding, in which the processing of the input signals is carried out in a digital form from the beginning and the output is digital.

Decoding by analogic/digital transformation in which the input signals are combined to give a voltage value which is proportional to the activated row or column number, and which is later passed through an analogic/digital converter that renders the row or column binary number.

Decoding by the combination of the two aforementioned methods.

Should several cells be activated simultaneously, it is possible to detect the presence of more than one active cell when using one of the three above mentioned methods, and proceed accordingly.

All three methods are very fast and allows the elimination of the amplifying stage as well as of the geometric center calculation.

The selection of one of the methods depends on different parameters required, as speed of response, final application and available budget.

The digital anode is made out of semi-conductor material and is composed of a surface of active cells interconnected by means of horizontal and vertical conductive lines, using the same techniques as those used in the manufacture of integrated circuits.

DETAILED DESCRIPTION OF THE DRAWINGS

FIG. "1-a" is partially sectioned perspective view of a microchannel plate showing the grouped glass or plastic capillary tubes, whose inner wall is covered with an electro-sensitive material.

FIG. "1-b" shows that upon applying a voltage between the two faces of a microchannel plate (1), an electron arrives to the upper surface and an avalanche of electrons is created and a big quantity of them emerges from the other surface.

FIG. "2" shows schematically the use of a pair of microchannel plates in the observation of very wear light energy. When a photon strikes the surface of a photocathode, an electron is released, which upon arrival to the microchannel plate is multiplied and at the output of the plate a great number of electrons exit which upon striking a phosphorus-covered screen make the image visible to the human eye.

FIG. "3" shows a resistive anode which is a resistive material thin film placed over a ceramic base. The sides of the film are slightly curved and the corners are connected to terminals "A", "B", "C" and "D".

FIG. "4-a" shows the function of a resistive anode in which an electron cloud strikes the film.

FIG. "4-b" shows how the electrons are displaced to the four corners, the quantity of electrons gathered at each terminal depending on the relative location of the electron cloud, thus allowing for the calculation of its XY coordinates.

FIG. "4-c" shows a case in which several electron clouds are present; in this case, the coordinates shown correspond to the geometric center of the electron clouds.

FIG. "5a and 5b" represents a digital anode device made out of semi-conductor material, which is composed of a number of active elements placed in the form of a mesh or net, interconnected by vertical and horizontal conductive lines. These lines end in decoding circuits which indicate, in a digital form, the cell that has been activated by the arrival of electrons. In this case, the decoder renders the values (2,1) which is the active cell marked in the figure.

FIG. "6" represents an activated cell composed of an amplifier "A" with an input "I" and two outputs "r" and "c" connected to the row and column lines of the digital anode. Condenser "c" is positively charged; upon arrival of the electrons all or part of the positive charge is neutralized and a negative transition voltage at the amplifier input is produced, which is reflected in a positive impulse at the outputs "r" and "c".

Figure 7:
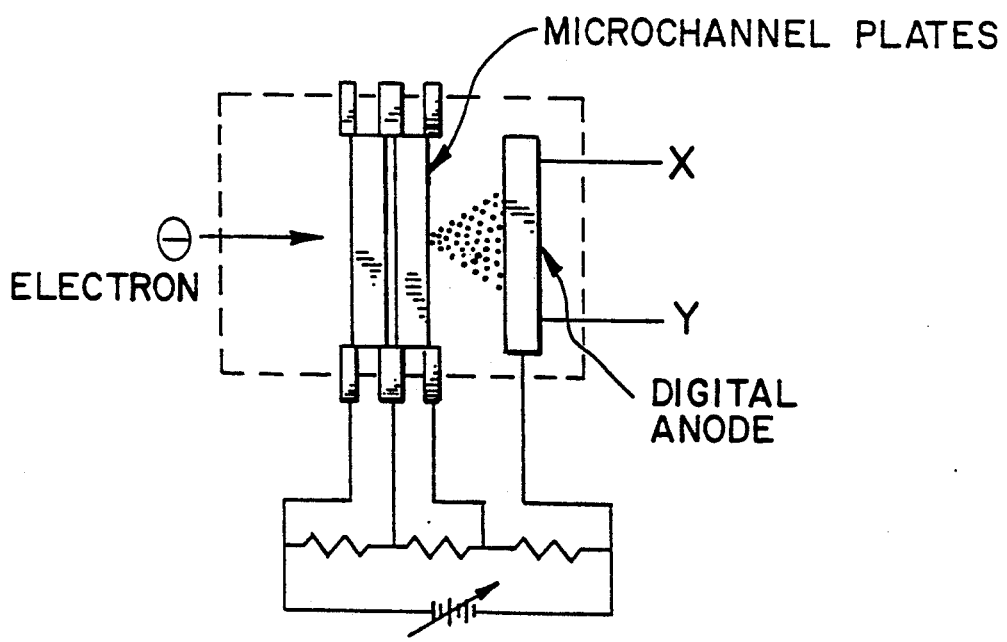
FIG. 7 is a schematic representation of a digital anode in a two-plate microchannel system.

FIG. 7 represents an application of the digital anode in a two-plate microchannel system showing how the arrival of an electron prompts an avalanche of electrons that strike on the digital anode with the consequent activation of some cells. By means of the decoder, the values XY show the values for the location of the electron cloud.

I claim:

1. A digital anode that enables the capture of electrons on a given surface and permits to know their precise location by digitalizing their position in a system of cartesian coordinates, said digital anode comprising a plurality of electronic transducers that have a given initial voltage and a different voltage value when they have captured electrons, said transducers being interconnected, in a system of cartesian coordinates, by horizontal and vertical lines, said lines being directly connected to decoding electronic circuits that furnish the position of said electrons substantially simultaneously upon said capturing of said electrons by said transducers.

2. A digital anode as recited in claim 1, wherein the input voltage varies within a range of, from 45% to 95% of the voltage of the transducer itself and wherein the output voltage responds to on/off electrical signal.

3. A digital anode as recited in claim 1, wherein the decoding electronic circuits are connected to yield information in a binary, analogic or decimal form.

* * * * *